United States Patent
Manohar et al.

(10) Patent No.: US 9,396,255 B2
(45) Date of Patent: Jul. 19, 2016

(54) METHODS AND SYSTEMS FOR FACILITATING EVALUATION OF DOCUMENTS

(71) Applicant: Xerox Corporation, Norwalk, CT (US)

(72) Inventors: Pallavi Manohar, Thane (IN); Shourya Roy, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 229 days.

(21) Appl. No.: 13/973,271

(22) Filed: Aug. 22, 2013

(65) Prior Publication Data
US 2015/0058362 A1 Feb. 26, 2015

(51) Int. Cl.
G06F 17/00 (2006.01)
G06F 17/30 (2006.01)
G06Q 50/00 (2012.01)
G09B 19/00 (2006.01)
G09B 7/02 (2006.01)

(52) U.S. Cl.
CPC ............ *G06F 17/3071* (2013.01); *G06Q 50/01* (2013.01); *G09B 7/02* (2013.01); *G09B 19/00* (2013.01)

(58) Field of Classification Search
CPC .............................................. G09B 7/00–7/12
See application file for complete search history.

(56) References Cited

U.S. PATENT DOCUMENTS

| 5,321,611 A * | 6/1994 | Clark et al. ................... 434/353 |
| 6,311,040 B1 * | 10/2001 | Kucinski ................ G06Q 30/02 434/350 |
| 2012/0240039 A1 * | 9/2012 | Walker et al. ................ 715/265 |

OTHER PUBLICATIONS

Monika S.,—The application of crowd sourcing in educational activities *Social Technologies*, 2012, pp. 67-76.
Daniel Weld et al., Personalized online education—A crowdsourcing challenge, *HCOMP*, 2012.
B. Hartmann et al., Communitysourcing: Engaging local crowds to perform expert works via physical kiosks, *ACM CHI*, 2012.

* cited by examiner

*Primary Examiner* — Keith Bloomquist (57) ABSTRACT

Methods and systems for facilitating evaluation of one or more electronic documents. One or more templates are extracted from the one or more electronic documents. At least one area in the one or more templates is identified. The at least one area includes a response provided by a user associated with the electronic document. One or more groups are generated based on similarity between the responses in the at least one area in the one or more templates. The one or more groups are distributed to one or more remote workers or a crowdsourcing platform for the evaluation.

20 Claims, 7 Drawing Sheets

Directions: Read the sentences below. In the blanks, write the antonym of the underlined word in each sentence.

| happy | above | top | in | high | first |
| empty | old | hard | old | open | |

1. Every time I close the cookie jar, my sneaky brother goes over to __open__ it.
2. When I was little, my sister slept on the __top__ bunk and I slept on the bottom.
3. Yesterday when my friend came over to play, I was __happy__, but when she left, I was sad.
4. Kyle taught us that you can roll a ball low, along the grass, or toss it really __high__ in the air.
5. When my glass of milk is __empty__, I'll fill it up again until it is full.
6. The subway travels below the ground and the passenger train travels __above__.
7. Allison Acquisto is always __first__ in line, and Zachary Zween is always last.
8. We go __in__ through the front door and out through the back door.
9. Grandma Caroline is funny and very __old__, but baby Caroline is tiny and very young.
10. The truck that is in the box is __hard__, however the feather is soft.

We asked students to write antonym to the underlined word:

1. Every time I <u>close</u> the cookie jar, my sneaky brother goes over to _______ it.

Can you help us to find out who did it right and who did not? The correct answer is "open".

Student - 1
Student - 2
Student - 3
Student - 4
Student - 5

Mark All Correct
Mark All Wrong

FIG. 4D

METHODS AND SYSTEMS FOR FACILITATING EVALUATION OF DOCUMENTS

TECHNICAL FIELD

The presently disclosed embodiments are related, in general, to crowdsourcing. More particularly, the presently disclosed embodiments are related to methods and systems for facilitating evaluation of documents through crowdsourcing.

BACKGROUND

Evaluation of student's work, including handwritten tests, has been a tedious task for educational institutes. Conventionally, teachers have to evaluate assessment tests manually to check academic progress of pupils. This manual assessment may constitute a significant part of teachers' workload along with mental fatigue during repetitious assessment.

Tools are available to help the teachers in grading the assessment tests of the students. For example, some tools can auto-grade the assessment tests where responses by the students are provided in bubble shaped regions. Further, some tools can automate the grading of the assessment tests where responses are provided in the form of tick/cross marks. However, these tools are capable to perform automatic assessment of the tests of limited types (e.g., where responses can only be provided in alphanumeric characters, bubbles, tick/cross marks, etc.) In view of the above, there remains a need to evaluate the documents (e.g., assignments for the students including handwritten content) efficiently.

SUMMARY

According to embodiments illustrated herein, there is provided a method for facilitating evaluation of one or more electronic documents. The method includes extracting one or more templates from the one or more electronic documents. The method further includes identifying at least one area in the one or more templates. The at least one area comprises a response provided by a user associated with the electronic document. The method further includes generating one or more groups based on similarity between the responses in the at least one area in the one or more templates. The method further includes distributing the one or more groups to one or more remote workers or a crowdsourcing platform for the evaluation. The method is performed by one or more processors.

According to embodiments illustrated herein, there is provided a system for facilitating evaluation of one or more electronic documents. The system includes one or more processors operable to extract one or more templates from the one or more electronic documents. The one or more processors are further operable to identify at least one area in the one or more templates. The at least one area includes a response provided by a user associated with the electronic document. Further, the one or more processors are operable to generate one or more groups based on similarity between the responses in the at least one area in the one or more templates. The one or more processors are further operable to distribute the one or more groups to one or more remote workers or a crowdsourcing platform for the evaluation.

According to embodiments illustrated herein, there is provided a computer program product for use with a computer. The computer program product includes a non-transitory computer readable medium. The non-transitory computer readable medium stores a computer program code for facilitating evaluation of one or more electronic documents. The computer program code is executable by one or more processors to: extract one or more templates from the one or more electronic documents; identify at least one area in the one or more templates, wherein the at least one area comprises a response provided by a user associated with the electronic document; generate one or more groups based on similarity between the responses in the at least one area in the one or more templates; and distribute the one or more groups to one or more remote workers or a crowdsourcing platform for the evaluation.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

"Crowdsourcing" refers to distributing tasks by soliciting the participation of defined groups of users. A group of users may include, for example, individuals responding to a solicitation posted on a certain website (e.g., crowdsourcing platform), such as Amazon Mechanical Turk or Crowd Flower.

A "crowdsourcing platform" refers to a business application, wherein a broad, loosely defined external group of people, community, or organization provides solutions as outputs for any specific business processes received by the application as input. In an embodiment, the business application may be hosted online on a web portal. Various examples of the crowdsourcing platforms include, but are not limited to, Amazon Mechanical Turk or Crowd Flower.

A "remote worker" refers to a worker or a group of workers that may perform one or more crowdsourcing tasks that generate data that contribute to a defined result, such as proofreading part of a digital version of an ancient text or analyzing a small quantum of a large volume of data. In an embodiment, using the crowdsourcing platform, the remote worker performs the one or more crowdsourcing tasks corresponding to the evaluation of documents. Hereinafter, "remote worker", "worker", "crowdsourced workforce," "crowdworker," "crowd workforce," and "crowd" may be interchangeably used.

A "worksheet" refers to a document on a medium (such as paper) including one or more questions and corresponding responses. In an embodiment, the worksheet refers to an assessment test in which the one or more questions may be handwritten or typed by a teacher and the corresponding responses may be handwritten or typed by a student attempting the assessment test.

An "electronic document" refers to a digitized copy of the worksheet. In an embodiment, the electronic document is obtained by scanning the worksheet using a scanner, a multifunctional device (MFD), or other similar devices. The electronic document can be stored in various file formats, such as, JPG or JPEG, GIF, TIFF, PNG, BMP, RAW, PSD, PSP, PDF, and the like.

A "template" refers to a portion of the electronic document including one or more questions and corresponding responses. In an embodiment, the one or more templates may be extracted from the electronic document by leveraging fixed structure of the electronic documents (e.g., predefined positions of the questions and corresponding responses in the electronic documents). The one or more templates may be extracted using image-processing techniques known in the art.

An "area" in the template refers to a portion of the template comprising one or more responses. In an embodiment, the one or more areas in the templates may be identified and extracted using the image-processing techniques.

A "group" refers to a collection of the one or more areas with similar responses. In an embodiment, the responses provided by the students are identified in the one or more areas and subsequently the one or more areas are clustered to generate the one or more groups based on similar responses. Known techniques to cluster the one or more areas may include, but are not limited to, standard clustering algorithm, or similar techniques.

Figure 1:
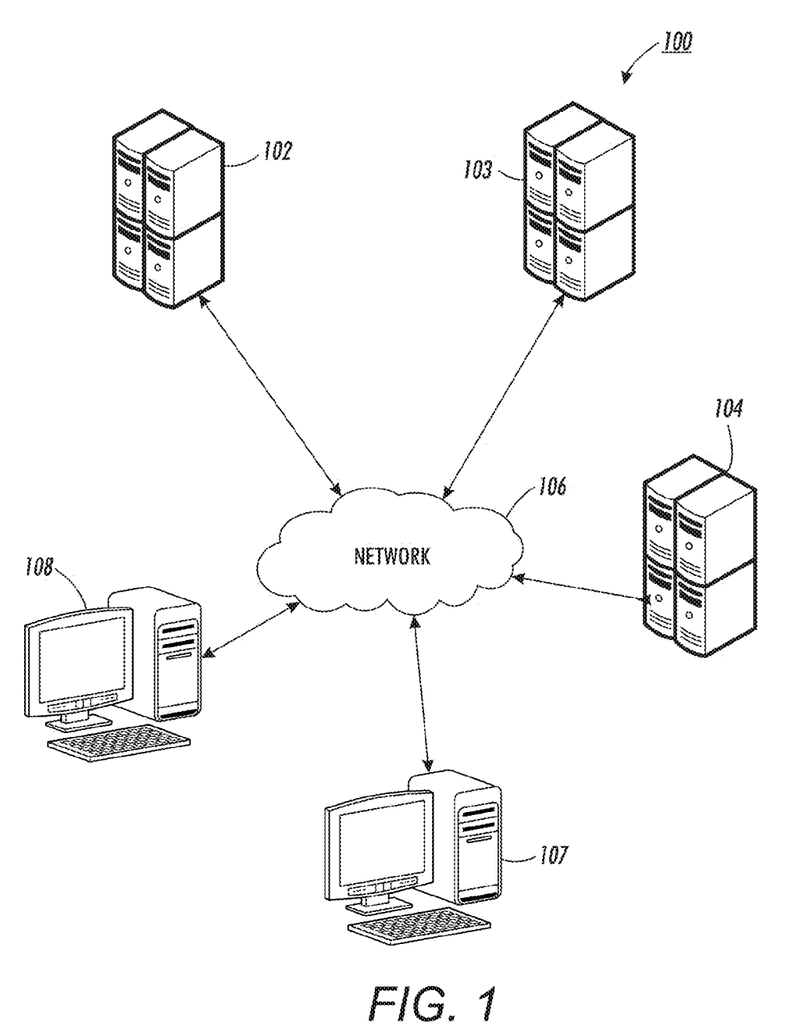
FIG. 1 is a block diagram illustrating a system environment in which various embodiments may be implemented.

FIG. 1 is a block diagram illustrating a system environment 100 in which various embodiments may be implemented. The system environment 100 includes an application server 102, a crowdsourcing platform server 103, a database server 104, a network 106, a requester-computing device 107 and a worker-computing device 108. The application server 102, the crowdsourcing platform server 103, the database server 104, the requester-computing device 107, and the worker-computing device 108 are interconnected over the network 106.

The application server 102 is capable to host an application/tool/framework for facilitating evaluation of documents, in accordance with at least one embodiment. In an embodiment, a teacher (i.e., requester) accesses the application server 102 and submits one or more electronic documents. The application server 102 extracts one or more templates from the one or more electronic documents. Further, one or more areas are identified in the one or more templates and are clustered to generate one or more groups. The application server 102 further creates one or more tasks based on the one or more groups. Some examples of the application server 102 may include, but not limited to, Java application server, .NET framework, and Base4 application server.

The crowdsourcing platform server 103 may refer to a device or a computer that hosts one or more crowdsourcing platforms. In an embodiment, the crowdsourcing platform server 103 receives the one or more tasks from the application server 102. Further, the crowdsourcing platform server 103 may communicate the one or more tasks to the one or more remote workers associated with the crowdsourcing platforms. In an embodiment, the crowdsourcing platform server 103 present a user interface (UI) to the one or more remote workers through a web based interface or a client application. The one or more remote workers may access the one or more tasks through the web based interface or the client application. Further, the one or more remote workers may submit a final work product to the crowdsourcing platform server 103 through the web based interface. In an alternate embodiment, the crowdsourcing platform server 103 may itself host the application for facilitating evaluation of documents. The crowdsourcing platform server 103 may be realized through an application server such as, but not limited to, Java application server, .NET framework, and Base4 application server.

In yet another embodiment, the application for facilitating evaluation of documents may also be installed on the requester-computing device 107 without departing from the scope of the invention.

The database server 104 may refer to a device or a computer that maintains a repository of the tasks assigned to the remote workers. In an embodiment, the database server 104 may store scores corresponding to the evaluated one or more electronic documents. Further, various reports generated based on the scores of the evaluated one or more electronic documents may also be stored in the database server 104. The database server 104 may receive a query from the application server 102 or the crowdsourcing platform server 103 to retrieve the data pertaining to the tasks. For querying the database server 104, one or more querying languages may be utilized such as, but are not limited to, SQL, QUEL, DMX, and so forth. Further, the database server 104 may be realized through various technologies, such as, but not limited to, Microsoft® SQL server, Oracle, and My SQL. In an embodiment, the application server 102 or the crowdsourcing platform server 103 may be connected to the database server 104 using one or more protocols such as, but not limited to, ODBC protocol and JDBC protocol.

A person skilled in the art would understand that the scope of the disclosure should not be limited to the database server 104 as a separate entity. In an embodiment, the functionalities of the application server 102 and the database server 104 may be combined into a single server, without departing from the scope of the disclosure. In an alternate embodiment, functionalities of the application server 102 and the database server 104 may be integrated into the crowdsourcing platform server 103.

The network 106 corresponds to a medium through which content and messages flow between various devices of the system environment 100 (e.g., the worker-computing device 108, the database server 104, the application server 102, the crowdsourcing platform server 103, and the requester-computing device 107). Examples of the network 106 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 106 in accordance with the various wired and wireless communication protocols such as Transmission Control Protocol and Internet Protocol (TCP/IP), User Datagram Protocol (UDP), and 2G, 3G, or 4G communication protocols.

The requester-computing device 107 may refer to a computing device, used by the teacher, to upload the one or more electronic documents. In an embodiment, the teacher may access the application server 102 to upload the one or more electronic documents. In an alternate embodiment, the teacher may access the crowdsourcing platform server 103 to upload the one or more electronic documents. The teacher may upload the one or more electronic documents using a variety of computing devices, other than shown requester-computing device 107, such as a laptop, a personal digital assistant (PDA), a tablet computer, and the like.

The worker-computing device 107 refers to a computing device, used by the one or more remote workers, to perform the one or more tasks. In an embodiment, the one or more remote workers access the crowdsourcing platform server 103 over the network 106 to perform the one or more tasks corresponding to the evaluation of the one or more electronic documents. In an embodiment, the remote workers may perform the tasks using a variety of computing devices, other than shown worker-computing device 108, such as a laptop, a personal digital assistant (PDA), a tablet computer, and the like.

Figure 2:
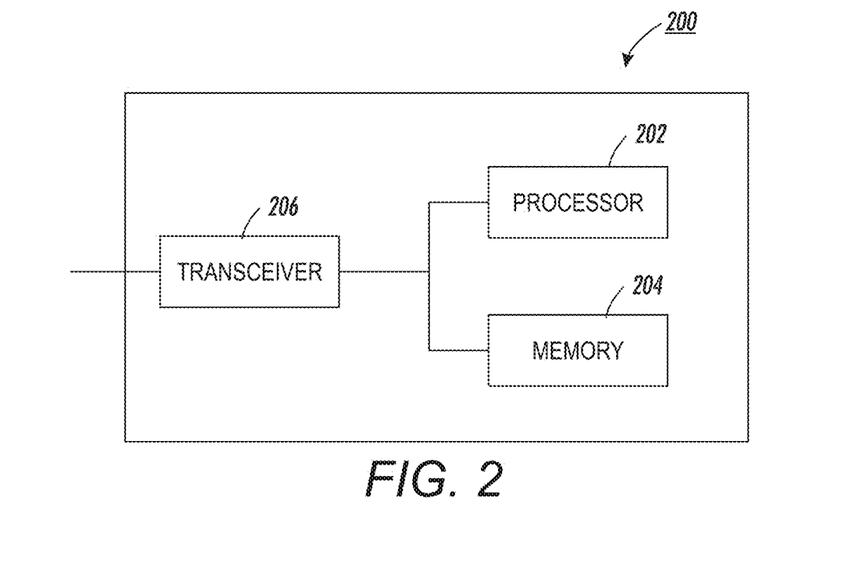
FIG. 2 is a block diagram illustrating a system for facilitating evaluation of documents, in accordance with at least one embodiment.

FIG. 2 is a block diagram illustrating a system 200 for facilitating evaluation of documents, in accordance with at least one embodiment. The system 200 includes a processor 202, a memory 204, and a transceiver 206. Although for the purpose of ongoing description, the system 200 has been considered the application server 102, the system 200 may also correspond to the requester-computing device 107 or the crowdsourcing platform server 103 without departing from the scope of the disclosure.

The processor 202 is coupled to the memory 204 and the transceiver 206. The processor 202 includes suitable logic, circuitry, and/or interfaces that are operable to execute one or more instructions stored in the memory 204 to perform predetermined operation. The memory 204 may be operable to store the one or more instructions. The processor 202 may be implemented using one or more processor technologies known in the art. Examples of the processor 202 include, but not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person having ordinary skills in the art that the one or more instructions stored in the memory 204 enables the hardware of the system 200 to perform the predetermined operation.

The transceiver 206 transmits and receives messages and data to/from various components of the system environment 100 (e.g., the application server 102, the database server 104, the requester-computing device 107, and the worker-computing device 108). Examples of the transceiver 206 may include, but are not limited to, an antenna, an Ethernet port, an USB port or any other port that can be configured to receive and transmit data. The transceiver 206 transmits and receives data/messages in accordance with the various communication protocols, such as, TCP/IP, UDP, and 2G, 3G, or 4G communication protocols.

Figure 3:
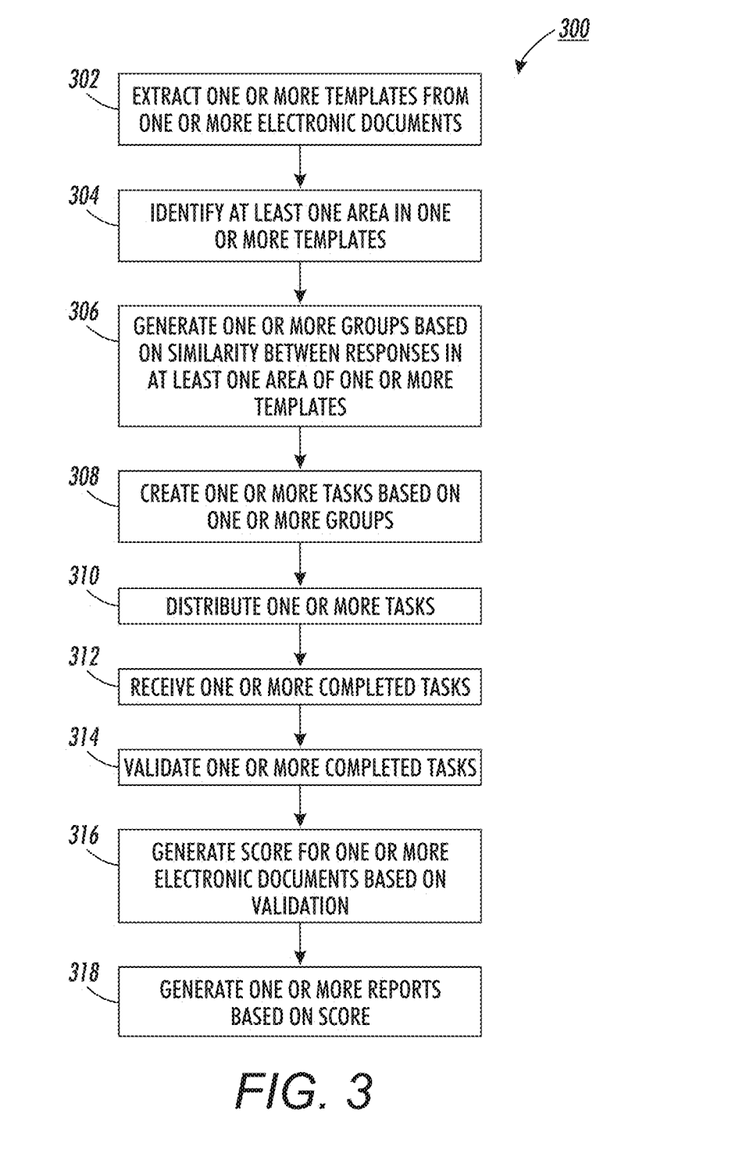
FIG. 3 is a flowchart illustrating a method for facilitating evaluation of documents, in accordance with at least one embodiment.

The operation of the system 200 for facilitating evaluation of documents has been described in conjunction with FIG. 3.

FIG. 3 is a flowchart 300 illustrating a method for facilitating evaluation of documents, in accordance with at least one embodiment. The flowchart 300 is described in conjunction with FIG. 1 and FIG. 2.

At step 302, the one or more templates are extracted from the one or more electronic documents. In an embodiment, the processor 202 is configured to extract the one or more templates. The processor 202 uses fixed structure of the one or more electronic documents (e.g., pre-defined positions of the questions and the responses in the one or more electronic documents) to extract the one or more templates by using image-processing techniques known in the art. In an embodiment, the processor 202 extracts the templates such that each of the one or more templates includes one question (from the one or more questions) and corresponding responses by the one or more students. In an alternate embodiment, the teacher may specify a region, defining a boundary of the template to be extracted. The extraction of the one or more templates is described later in conjunction with FIG. 4.

At step 304, at least one area in the one or more templates is identified by the processor 202. In an embodiment, the at least one area corresponds to a portion that includes the response provided by the student. The at least one area in the one or more templates may be identified by the image-processing techniques known in the art. In an embodiment, the processor 202 is further operable to identify the responses provided by the student in the at least one area using handwriting recognition techniques (e.g., optical character recognition).

At step 306, the one or more groups are generated by the processor 202 based on the identification of the responses provided by the students. Further, the processor 202 is operable to cluster the at least one area with similar responses. For example, if 6 students have provided the response to a question as "open" and 4 students provide the response as "closed", then two groups with the responses "closed" and "open" are created.

At step 308, the one or more tasks are created based on the one or more groups. In an embodiment, the processor 202 is operable to create the one or more tasks for each of the one or more groups. As each of the one or more groups includes areas of the one or more electronic documents having similar responses, each of the one or more tasks includes areas of the one or more electronic documents having similar responses. Further, the processor 202 may add necessary information, which can be used for performing the one or more tasks. The examples of the necessary information may include, but are not limited to, time required for completion of one or more tasks, amount to be paid for the one or more tasks and so forth. In an embodiment, the processor 202 creates the one or more tasks such that each task includes one question from the electronic document and the corresponding responses provided by the one or more students. Further, names of the students corresponding to the one or more responses may also be displayed in the task.

At step 310, the one or more tasks are distributed. In an embodiment, the processor 202 is operable to communicate with the worker-computing device 108 to communicate the one or more tasks. In an alternate embodiment, the processor 202 communicates the one or more tasks to the crowdsourcing platform server 103, from where the one or more tasks are communicated further to the worker-computing device 108. The remote workers may attempt the one or more tasks using the UI presented by the crowdsourcing platform server 103.

In an embodiment, the remote worker attempts a qualifying test before performing the one or more tasks. The qualifying test may present one or more new questions, which solicit responses from the remote worker. In an embodiment, remote workers with a pre-defined threshold number of correct responses (e.g., 90% correct responses to the one or more new questions) are allowed to perform the one or more tasks. The one or more new questions may be same or different from the one or more questions in the one or more tasks. In an embodiment, prior to evaluation of the question in the task by the remote worker, the task solicits response to the question from the remote worker. Further example of the evaluation of the task by the remote worker is presented in conjunction with FIG. 4.

At step 312, one or more completed tasks are received by the processor 202. In an embodiment, after completing the one or more tasks, the one or more remote workers submit the one or more completed tasks using the UI. The one or more completed tasks may include the evaluation performed by the one or more remote workers.

At step 314, validation of the one or more completed tasks is performed. The processor 202 is operable to aggregate the one or more completed tasks to generate one or more evaluated electronic documents corresponding to the one or more electronic documents. In an embodiment, besides every question in the one or more evaluated electronic documents, a tick or cross mark is put corresponding to a correct or wrong response by the student.

At step 316, a score corresponding to the one or more electronic documents is generated. In an embodiment, based on the one or more evaluated electronic documents, the processor 202 calculates the score. The score may be stored in the database server 104.

At step 318, one or more reports are generated by the processor 202. In an embodiment, the one or more reports are generated based on the score and are stored in the database server 104 for later retrieval.

FIGS. 4A, 4B, 4C, and 4D depict series of images 400a, 400b, 400c, and 400d, in accordance with at least one embodiment of the present disclosure. The images 400a, 400b, 400c, and 400d illustrate the electronic document 402, the one or more templates 404a-404h (hereinafter collectively referred to as the one or more templates 404), the one or more groups 406a and 406b (hereinafter collectively referred to as the one or more groups 406), and the task 408, respectively. In an embodiment, the images 400a, 400b, 400c, and 400d correspond to the method for facilitating evaluation of the electronic document 402.

Figure 4A:
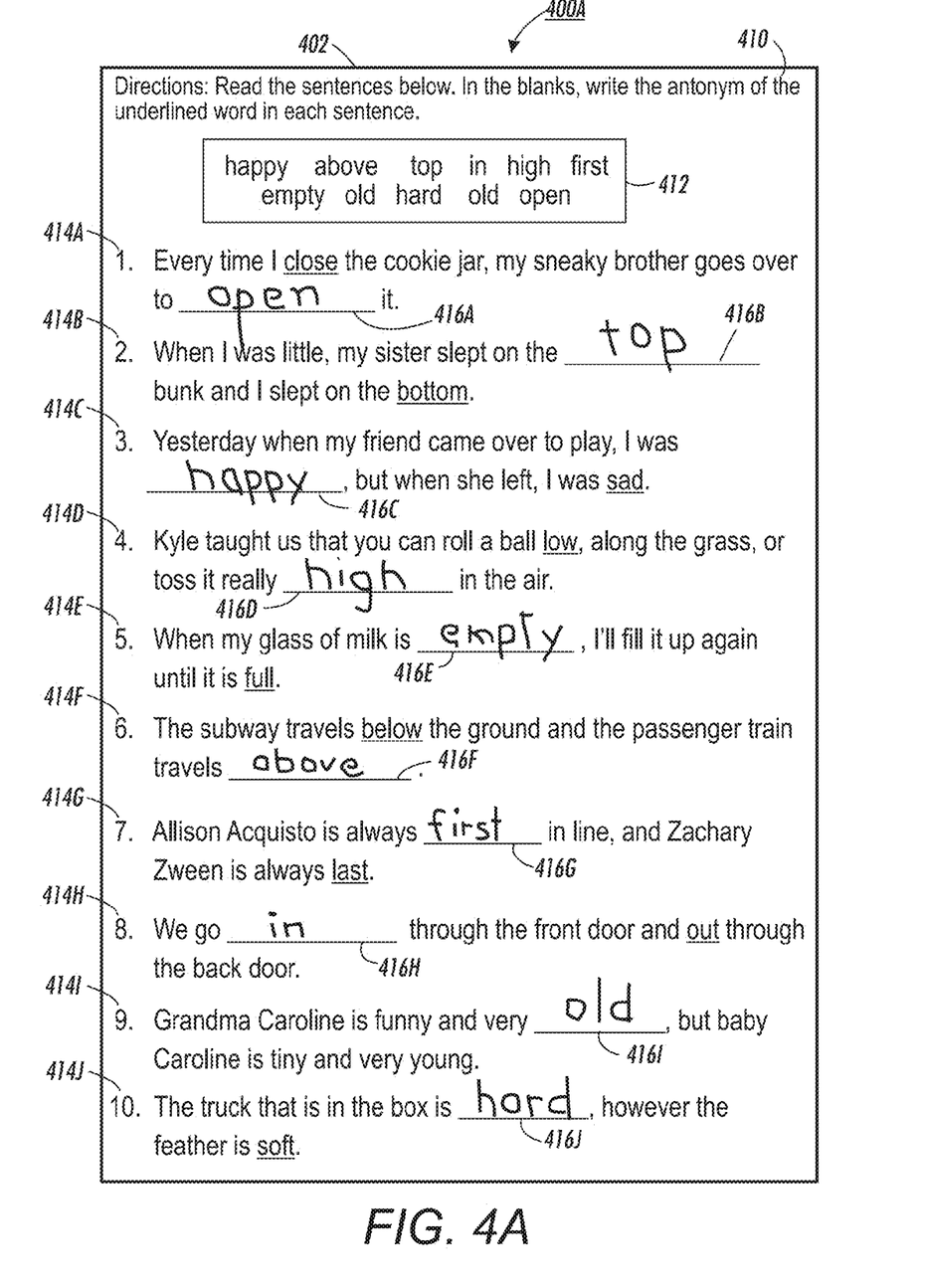
FIGS. 4A, 4B, 4C, and 4D depict a series of images, in accordance with at least one embodiment.

The electronic document 402 is obtained from the worksheet (not shown) corresponding to an assessment test created by the teacher. The electronic document 402 includes a direction section 410, a hint section 412, the one or more questions 414a-414j (hereinafter collectively referred to as the one or more questions 414), and the one or more areas 416a-416j (hereinafter collectively referred to as the one or more areas 416). The direction section 410 in the electronic document 402 facilitates the students to attempt the assessment test by providing required directions/instructions for attempting the assessment test (i.e., what the students are expected to do in the assessment test). The hint section 412 provides the students the options, from which to select the responses for the one or more questions 414. The one or more areas 416 include the responses provided by the students. The electronic document 402 may be submitted by the teacher to the application server 102 or the crowdsourcing platform server 103, using the requester-computing device 107.

Figure 4B:
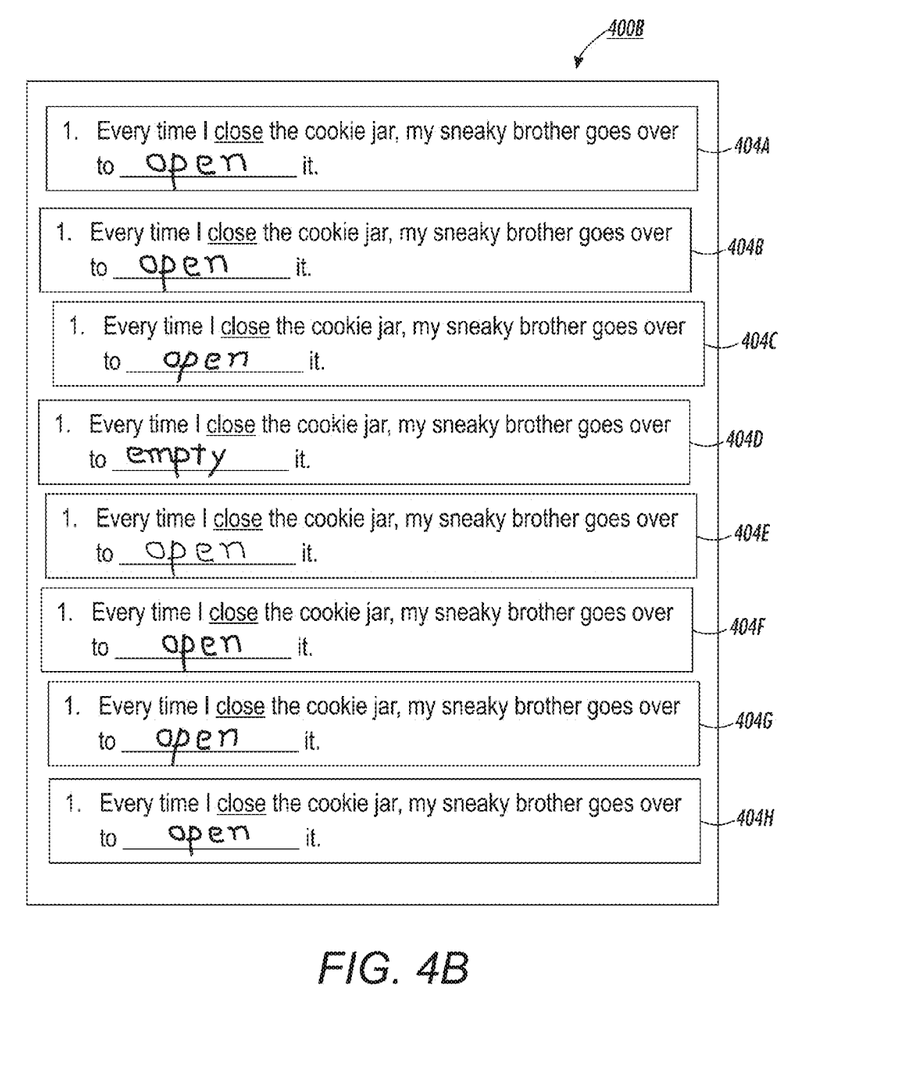

In accordance with step 302, the electronic document 402 is processed by the processor 202 to extract the one or more templates 404. FIG. 4B illustrates the one or more templates 404 corresponding to one question (i.e. the question 414a) from the one or more questions 414. It would be apparent that multiple templates (i.e., 404a-404h), shown in FIG. 4B, correspond to the question 414a for multiple students and that similar templates may be extracted for each of the one or more questions 414 in the electronic document 402.

In accordance with step 304, the one or more areas 416a are identified in the one or more templates 404 by the processor 202. For example, as depicted in FIG. 4B, the one or more areas 416a including the response "open" or "empty" by the students, are identified by the processor 202 using handwriting recognition techniques known in the art. It is apparent from FIG. 4B that the one or more areas 416a correspond to the responses provided by the multiple students to the question 414a of the electronic document 402.

Figure 4C:
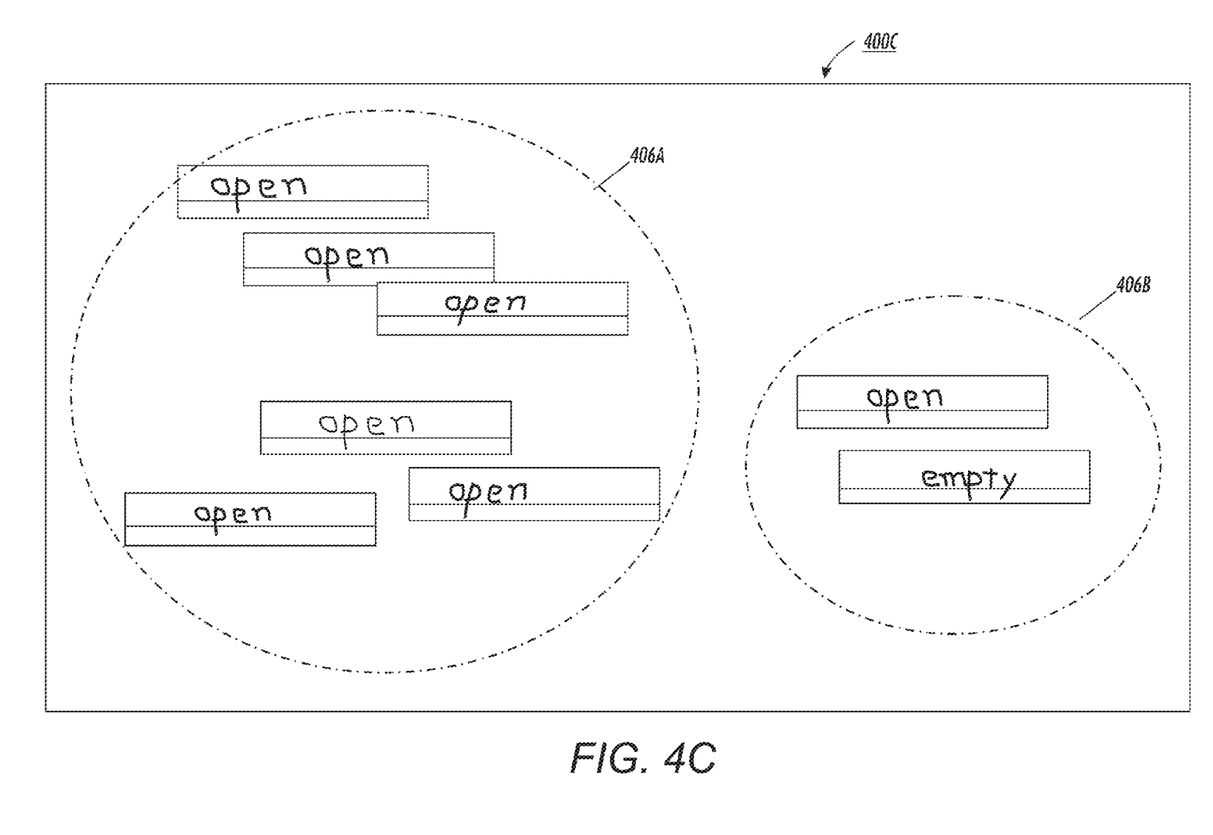

In accordance with step 306, based on the identification of the one or more areas 416 in the one or more templates 404 and corresponding responses, the one or more groups 406 are generated. For example, as depicted in FIG. 4C, similar responses provided in the one or more areas 416 will be clustered together to generate the one or more groups 406. Further, the processor 202 maintains a correlation between the response and the corresponding student, who provided the response. It is apparent from the FIG. 4C that the one or more groups 406 shown are corresponding to one question (i.e., the question 414a) and that similar groups may be generated corresponding to each of the one or more questions 414.

Figure 4D:
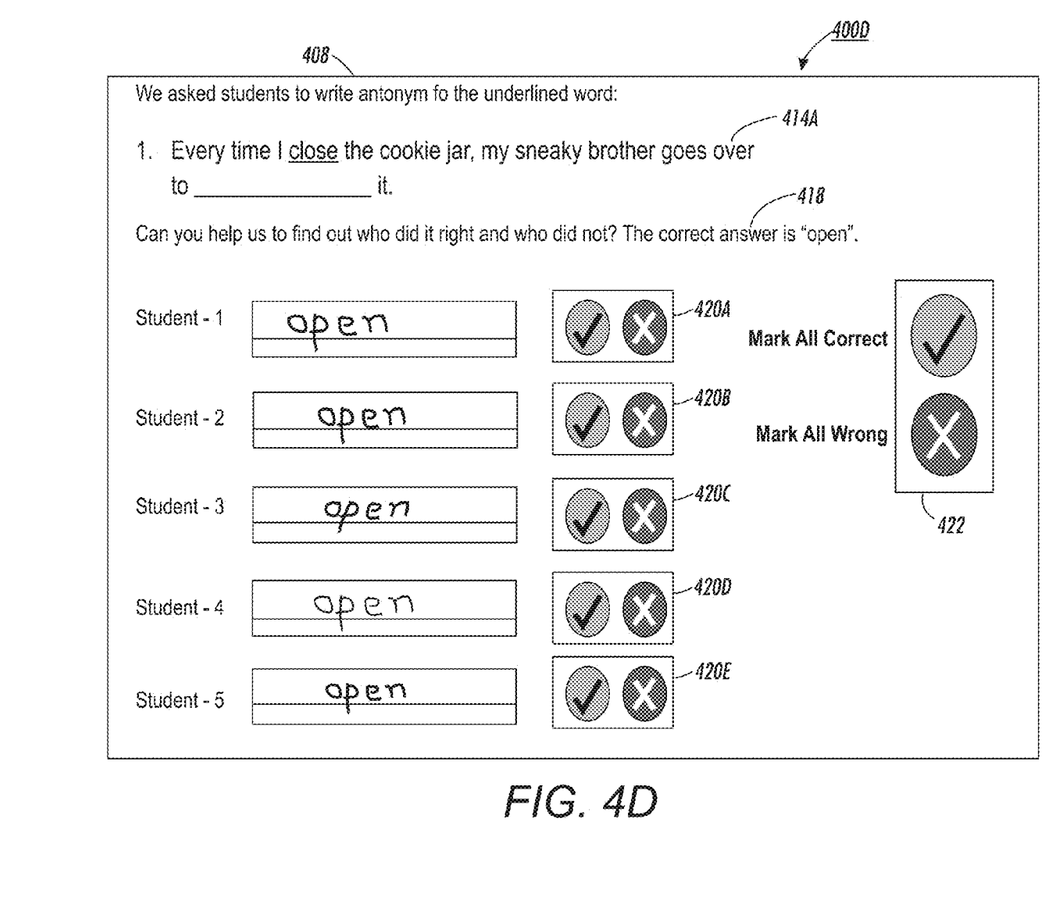

In accordance with step 308, the processor 202 creates the task 408 using the one or more groups 406. As illustrated in FIG. 4D, the task 408 includes the question 414a, an instruction section 418, first submit buttons 420a-420e (collectively referred to as the first submit buttons 420), and second submit button 422. Further, the task 408 includes the responses provided by the students and corresponding names of the students. The question 414a corresponds to the question, from which the one or more templates 404 are extracted and the one or more groups 406 are generated, in accordance with the step 304 and the step 308, respectively. The instruction section 418 in the task 408 provides the necessary information to perform the task 408 (i.e., what the remote workers are expected to do in the task 408). Further, the instruction section 418 includes the correct response, which the remote worker may use while evaluating the question 414a. The instruction section 418 may further include information (not depicted in the FIG. 4D) such as the price to be paid to the remote worker for the task 408, required time of completion of the task 408 and so forth. The first submit buttons 420 enables the remote worker to submit the evaluation of the response provided by one student. Based on the evaluation and using the first submit buttons 420, the remote worker may mark the question 414a as correct or wrong. Further, the second button 422 enables the remote worker to mark the evaluation for all the students in the task 408 in one go. Later, the remote worker may use the first submit buttons 420 to flip the marking for individual responses, if required, thus reducing the effort required by the remote worker for the evaluation.

In accordance with the step 310, the task 408 is distributed to the remote worker. In an embodiment, when the task 408 is created by the application server 102, it may be distributed to the crowdsourcing platform server 103, from the where the remote workers may attempt the task 408. Using the necessary information from the instruction section 418, the remote worker attempts the task 408. Further, using the first submit buttons 420 or the second submit button 422, the remote worker may perform the evaluation of the question 414a.

In an embodiment, the task 408 may be created such that the instruction section 418 does not include the correct response. In such a scenario, the remote worker may be instructed (using the instruction section 418) to provide a response, what the remote worker thinks is right, in an empty box (not shown) in the task 408. The task 408 may provide the correct response (e.g., provided by the teacher) to the question 414a after the remote worker submits the response in the empty box. In this way, the remote worker may get the opportunity to assess an evaluation for himself. It would be apparent that, later, the remote worker may perform the evaluation of the question 414a in the task 408 using the correct response provided by the task 408.

Further, in an alternate embodiment, the task 408 may be distributed to a set of remote workers to improve efficiency of the evaluation. The processor 202 may determine the correct response to the question 414a based on a majority of the remote workers in favor of the correct response.

Further, in an alternate embodiment, the remote worker may be instructed (using the instruction section 418) to attempt the qualifying test prior to the evaluation of the question 414a, as discussed in FIG. 3.

In accordance with step 312, the completed task 408 is received by the processor 202. It would be apparent that similar completed tasks may be received corresponding to each of the one or more questions 414.

In accordance with step 314, all of the completed tasks corresponding to the one or more questions 414 may be validated by the processor 202. In this validation, the processor 202 may aggregate the one or more questions 414 and corresponding evaluation performed by the one or more remote workers such that the evaluated electronic document may be obtained. In an embodiment, the processor 202 may put a cross and a tick mark besides a wrong and a correct response, in accordance with the evaluated electronic document.

In accordance with step 316, the processor 202 generates a score corresponding to the electronic document 402, based on the evaluated electronic document 402. In an embodiment, the score may be displayed on the top of the electronic document 402 such that the electronic document 402 appears as evaluated using conventional methods.

In accordance with step 318, the one or more reports may be generated based on the score. The score, which may be stored in the database server 104, may be used to generate the one or more reports, customized in accordance with the teacher's requirement.

The disclosed embodiments encompass numerous advantages. In an environment, where there is a requirement of evaluation of documents that require human intelligence, crowdsourcing is an efficient way to achieve the objective. As disclosed, the design of the task for the evaluation of the documents is such that the remote workers can evaluate the questions more efficiently. For example, the remote worker needs to read the question only once and may evaluate multiple responses corresponding to that question, as compared to conventional methods where each time the question needs to be read for different students while performing the evaluation. Further, the remote worker has the option to mark all the responses in one go and may later change the marking for few questions, if required, thus further reducing the effort required by the remote worker. The remote workers have the opportunity to learn while performing the evaluation. As disclosed, prior to the evaluation, the remote worker may be asked to provide the correct response according to him and thus the remote worker may do self-assessment with respect to the answer of the question.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for facilitating evaluation of documents have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for facilitating evaluation of one or more electronic documents, the method comprising:
    extracting, by one or more processors, one or more templates from each of the one or more electronic documents, wherein each of the one or more electronic documents comprises one or more questions and a response to each of the one or more questions, wherein each of the one or more templates comprises a question and the response corresponding to the question, extracted from each of the one or more electronic documents;
    identifying, by the one or more processors, areas in the one or more templates, wherein each of the identified areas comprises the response to the question provided by a user associated with each of the one or more electronic documents;
    clustering, by the one or more processors, a plurality of areas, comprising same responses to the question, from the identified areas into a group; and
    distributing, by the one or more processors, one or more groups, which includes at least the group, to one or more remote workers or a crowdsourcing platform for the evaluation.

2. The method of claim 1 further comprising scanning, by the one or more processors, one or more worksheets to obtain the one or more electronic documents.

3. The method of claim 1, wherein the one or more electronic documents comprise one or more of a direction section, and a hint section.

4. The method of claim 1 further comprising creating, by the one or more processors, one or more tasks for the one or more remote workers, wherein each of the one or more tasks comprises at least the question, one group from the one or more groups, a name of the user associated with the response in the one group, and an instruction for the evaluation of the at least one group.

5. The method of claim 4, wherein the one or more tasks further comprise a qualifying test to be attempted by the one or more remote workers prior to the evaluation of the at least one group.

6. The method of claim 5, wherein a pre-defined threshold for a correct response is used to select the one or more remote workers for the evaluation of the at least one group.

7. The method of claim 1 further comprising computing, by the one or more processors, a score for the one or more electronic documents based on the evaluation.

8. The method of claim 7 further comprising generating, by the one or more processors, one or more reports based on the score.

9. The method of claim 1 further comprising validating, by the one or more processors, the evaluated one or more groups, wherein the validating comprises grouping one or more templates corresponding to each of the one or more electronic documents.

10. A method for evaluating one or more electronic documents using crowdsourcing, the method comprising:
    extracting one or more templates from each of the one or more electronic documents, wherein each of the one or more electronic documents comprises one or more questions and a response to each of the one or more questions, wherein each of the one or more templates comprises a question and the response corresponding to the question, extracted from each of the one or more electronic documents;
    identifying areas in the one or more templates, wherein each of the identified areas comprises the response to the question provided by a user associated with each of the one or more electronic documents;
    clustering a plurality of areas, which comprises same responses to the question, from the identified areas into a group;
    creating one or more tasks based on one or more groups, which includes at least the group, wherein each of the one or more tasks comprises at least the question, one group from the one or more groups, a name of the user associated with the response in the one group, and an instruction for the evaluation of the at least one group; and
    distributing the one or more tasks to one or more remote workers or a crowdsourcing platform for the evaluation, wherein the method is performed by one or more processors.

11. A system for facilitating evaluation of one or more electronic documents, the system comprising:
one or more processors operable to:
extract one or more templates from each of the one or more electronic documents, wherein each of the one or more electronic documents comprises one or more questions and a response to each of the one or more questions, wherein each of the one or more templates comprises a question and the response corresponding to the question, extracted from each of the one or more electronic documents;
identify areas in the one or more templates, wherein each of the identified areas comprises the response to the question provided by a user associated with each of the one or more electronic documents;
cluster a plurality of areas, comprising same responses to the question, from the identified areas into a group; and
distribute one or more groups, which includes at least the group, to one or more remote workers or a crowdsourcing platform for the evaluation.

12. The system of claim 11, wherein the one or more processors are further operable to communicate with a scanning equipment to scan one or more worksheets to obtain the one or more electronic documents.

13. The system of claim 11, wherein the one or more electronic documents comprise one or more of a direction section, and a hint section.

14. The system of claim 11, wherein the one or more processors are further operable to create one or more tasks for the one or more remote workers, wherein each of the one or more tasks comprises at least the question, one group from the one or more groups, a name of the user associated with the response in the one group, and an instruction for the evaluation of the at least one group.

15. The system of claim 14, wherein the one or more tasks further comprise a qualifying test to be attempted by the one or more remote workers prior to the evaluation of the at least one group.

16. The system of claim 15, wherein a pre-defined threshold for a correct response is used to select the one or more remote workers for the evaluation of the at least one group.

17. The system of claim 11, wherein the one or more processors are further operable to validate the evaluated one or more groups, wherein the validating comprises grouping one or more templates corresponding to each of the one or more electronic documents.

18. The system of claim 11, wherein the one or more processors are further operable to compute a score for the one or more electronic documents based on the evaluation.

19. The system of claim 18, wherein the one or more processors are further operable to generate one or more reports based on the score.

20. A computer program product for use with a computer, the computer program product comprising a non-transitory computer readable medium, wherein the non-transitory computer readable medium stores a computer program code for facilitating evaluation of one or more electronic documents, wherein the computer program code is executable by one or more processors to:
extract one or more templates from each of the one or more electronic documents, wherein each of the one or more electronic documents comprises one or more questions and a response to each of the one or more questions, wherein each of the one or more templates comprises a question and the response corresponding to the question, extracted from each of the one or more electronic documents;
identify areas in the one or more templates, wherein each of the identified areas comprises the response to the question provided by a user associated with each of the one or more electronic documents;
cluster a plurality of areas, comprising same responses to the question, from the identified areas into a group; and
distribute one or more groups, which includes at least the group, to one or more remote workers or a crowdsourcing platform for the evaluation.

* * * * *